United States Patent [19]
Miller

[11] Patent Number: 4,512,115
[45] Date of Patent: Apr. 23, 1985

[54] METHOD FOR CYLINDRICAL GRINDING TURBINE ENGINE ROTOR ASSEMBLIES

[75] Inventor: Robert J. Miller, Vernon, Conn.

[73] Assignee: United Technologies Corporation, Hartford, Conn.

[21] Appl. No.: 501,983

[22] Filed: Jun. 7, 1983

[51] Int. Cl.³ .............................................. B24B 1/00
[52] U.S. Cl. .................................. 51/289 R; 51/49; 51/105 R; 29/156.8 B; 29/404
[58] Field of Search ................... 51/289 R, 105 R, 49; 29/156.8, 404

[56] References Cited

U.S. PATENT DOCUMENTS

| | | | |
|---|---|---|---|
| 2,730,794 | 1/1956 | Schörner | 29/156.8 |
| 2,795,900 | 6/1957 | Modler | 51/289 R |
| 3,673,897 | 7/1972 | Gassner | 51/289 R |
| 4,074,104 | 2/1978 | Fulkerson | 219/121 LM |

OTHER PUBLICATIONS

General Electric Extract from Shop Manual "Assembly 72-31-00 Jun. 1/77" pp. 548-551.
General Electric Extract from GEK 50355 "The CF6 Engine Compressor Rotor EROM Fixture Manual" Mar. 1, 1978, Introduction pp. 1, 2; Section 1-1, pp. 1, 2 Mar. 1978.

*Primary Examiner*—Harold D. Whitehead
*Attorney, Agent, or Firm*—C. G. Nessler

[57] ABSTRACT

Blade tips of a turbine rotor assembly are ground to precision dimensions of ±0.025 mm (±0.001 inch) when the assembly is rotated at high speed during grinding. The speed should be sufficient to produce on the blades a radial acceleration of at least 700 times the force of gravity (6,900 m/s²). For compressor rotors the direction of rotation should be such that the blades move toward their concave side, and the speed should be sufficient to produce an axial flow. High resultant tip velocities are compensated for when dry grinding titanium alloys by moving the grinding media in the same direction as the tangential velocity at the point of contact. Burrs are eliminated by feeding at a very slow rate, of the order of 0.0004 mm/s when the final dimension is approached.

14 Claims, 5 Drawing Figures

METHOD FOR CYLINDRICAL GRINDING TURBINE ENGINE ROTOR ASSEMBLIES

TECHNICAL FIELD

The present invention involves metalworking, most particularly the process of grinding the rotor assemblies of turbomachinery.

BACKGROUND

Most aircraft gas turbine engines, as well as axial flow turbomachines used in many other applications, have within them disks or rotors which carry a multiplicity of removable blades. Such structures are used in both the compressor and the turbine parts of the engine to respectively compress and expand the working fluid. In some instances the rotating blades have shrouds at their outermost tips and are connected at these locations. More commonly, modern engines have blades that lack shrouds and are only supported at their roots in the rotor disk. For high efficiency, it is desired to have the closest possible fit between the tips of the rotating blades and the sealing structure of the circumscribing case of the engine. The blades must be precisely machined to within as close as ±0.025 mm so that they are all at a constant radial distance from the center line of the engine. This presents a substantial machining problem, both in original part manufacture and in overhaul.

While the tolerances sought currently are tighter than previously, there has always been a desire to have bladed rotors fit well. Primarily this has been achieved by separately machining the rotors and blades to close tolerances and then assembling the parts. Preferably, horizontal rotary grinding machines have been used to machine the blades; fixtures rotating at a few hundred revolutions per minute hold the blades in a manner similar to that in which they are held in a rotor during use. Shims are placed under the blades to thrust them radially outward and to eliminate the inherent looseness related to the fit between blade and holder. However, such techniques have involved an accumulation of tolerances between the blades and rotor disk and they are inadequate to obtain the tolerances now desired.

Preferably, the rotor assembly for an engine is machined as a unit, as it will be used. This has been accomplished in one particular mode by the use of shims under the blades, as mentioned above, while spinning the rotor at no more than a few hundreds of revolutions per minute. Since most rotors used in gas turbine engines heretofore received individual blades in slots which ran generally perpendicular to the circumference of the part, the insertion of shims was relatively convenient. But, an alternative construction wherein the blades are received in a slot running circumferentially around the rim of the disk cannot be similarly treated. With this configuration it is not practical mechanically to insert shims. One approach believed taken by others has been to provide a close fit between the bottom of the blade root and the slot, thus preventing radially inward movement during machining. Sandwiching of the bladed rotor assembly between resilient pads has also been used to restrain the blade motion during grinding. But these methods do not appear capable of providing accuracies of better than ±0.075 mm.

A further problem has been that even though some relatively close fit tolerances were obtained previously, such tolerances did not necessarily result in the requisite high turbomachinery efficiency. It has been now found that part of the problem lies in the different seating dimensions assumed by the parts under the high rotational speed of use (of the order of 10,000 rpm), compared to the dimensions ascertainable from measurement of the static assembled parts. Also part of the problem resides in the fact that average dimensions of rotor assemblies were all that could be measured previously. Now, as described in commonly assigned Drinkuth et al patent application Ser. No. 501,982 "Method and Apparatus for Grinding Turbine Engine Rotor Assemblies Using Dynamic Optical Measurement System," apparatus is available for making individual blade measurements at high rotational speeds. The apparatus was useful in making the present invention.

DISCLOSURE OF THE INVENTION

An object of the invention is to rapidly and economically machine the tips of blades of turbine rotors and analogous bladed structures to high radial tolerances, to as close as ±0.025 mm.

According to the invention, a rotor assembly comprised of a multiplicity of blades mounted radially in a disk are machined by spinning the assembly at a critically high speed, sufficient to cause the blades to seat properly in the rotor and overcome any resilient forces or lack of tolerance which prevent proper seating at lower speeds. The rotational speed is in excess of 1000 rpm and is sufficient to counteract the force of the machining medium on the blade tip. The preferred medium is a grinding wheel.

In one aspect of the invention, the rotational speed of the assembly is such that there is caused a radial acceleration on the blades of at least 700 times the force of gravity or about 6,870 m/s$^2$. Preferably the rotational speed produced an acceleration of about 11,100 m/s$^2$ or about 1100 times gravitational force. At less than the critical speed rotors can be ground, but high tolerances of the order of ±0.025 mm are not achieved. For a typical 0.3 m radius rotor assembly, a preferred speed will be about 2000 rpm.

In another aspect of the invention, an axial flow turbomachine rotor having airfoil blades is rotated in a direction such that the surrounding air impinges on the blades in the same direction as impinges the working fluid during use of the rotor assembly. Preferably, the rotating speed will be sufficient to cause the surrounding air to flow axially in substantial quantity, compared to the radial flow which ensues at too low a speed.

The necessity for high rotational speeds to obtain accuracy in grinding produces unwanted effects in that the tangential velocity of blade tips is very high, in the range 60 m/s. This is in excess of the permissible dry grinding speed for titanium alloys and certain other materials. Thus, the grinding medium is moved in the same direction as the tangential velocity at the point where the blade tips are contacted, to provide a reduced relative or grinding velocity in the range 20–40 m/s. When a grinding wheel is used, the wheel is counter-rotated to the assembly to achieve the objective. In the preferred practice of the invention, on titanium compressor blades it is found that a grinding rate of less than 0.0004 mm/s is effective in reducing the formation of burrs.

The invention permits the manufacture of rotor assemblies which have outside diameters which are considerably more precise than obtainable heretofore. Tolerances of ±0.025 mm are commonly achieved. This results in closer and more uniform contact of the blades with the seal of an engine and provides higher efficiency and energy saving.

The foregoing and other objects, features and advantages of the present invention will become more apparent from the following description of preferred embodiments and accompanying drawings.

BEST MODE FOR CARRYING OUT THE INVENTION

The invention is described in terms of the grinding of a one stage of a high pressure compressor rotor assembly for a Model PW2037 gas turbine engine made by Pratt & Whitney Aircraft, East Hartford, Conn. The invention will be also useful for the finishing of other gas turbine engine parts where the blades are removably contained in a disk.

The high pressure compressor rotor assembly for the aforementioned PW2037 engine is comprised of a multiplicity of different axial flow stages attached to each other. These stages have slightly different outside diameters and they are finish ground to such diameters in sequence. The invention herein is described in terms of machining of one of these stages, which for simplicity is referred to as a rotor assembly. A rotor assembly is comprised of a disk having a circumferential slot in which are contained 50-75 titanium alloy compressor blades. Alpha beta titanium alloys such as Ti—6Al—4V, Ti—8Al—1V—1Mo, Ti—6Al—2Sn—4Zr—2Mo and Ti—6Al—2Sn—4Zr—6Mo are common in rotor blades. Iron and nickel base alloys are used also.

Figure 1:
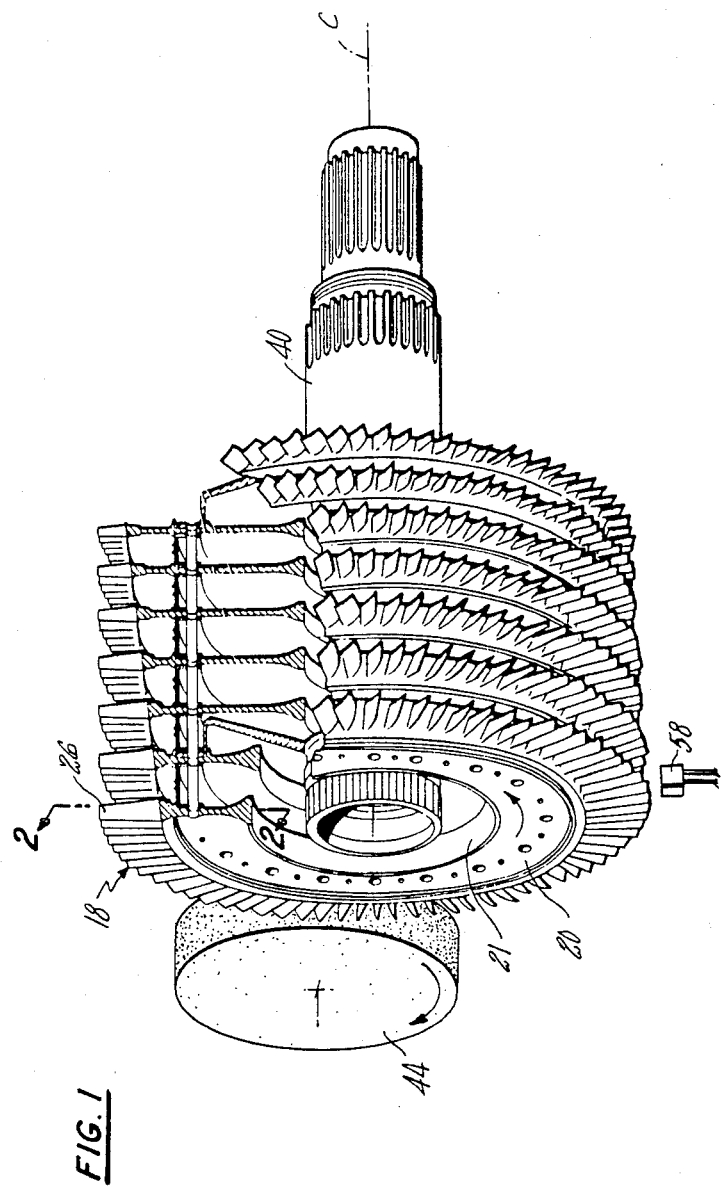
FIG. 1 shows a multi-stage gas turbine rotor as it is positioned for grinding.
Figure 2:
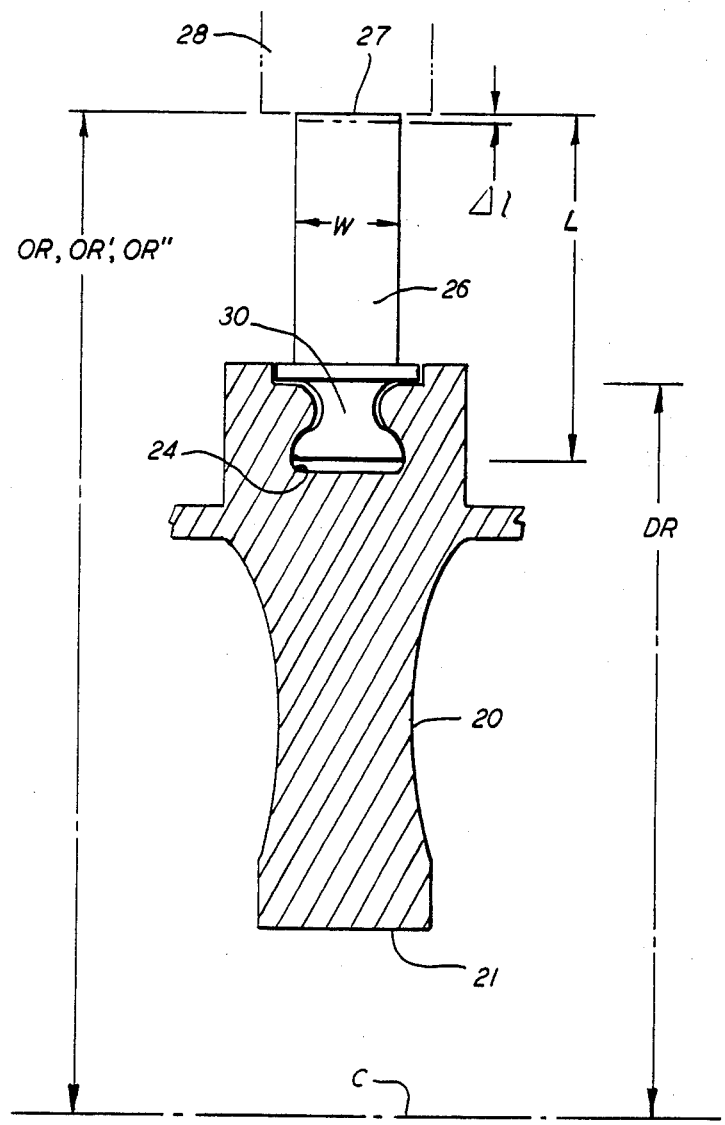
FIG. 2 shows a cross-section through one stage of the rotor in FIG. 1, illustrating how blades are mounted around the periphery of a disk to form a rotor assembly.

FIG. 1 shows in fragment how a rotor assembly 18 is ground and will be referred to again. FIG. 2 shows a cross section through the diametrical plane of the rotor assembly including a disk 20 having an outside radius DR and a bore 21 with a longitudinal centerline axis C. A circumferential slot 24 runs around the periphery of the disk and contained wherein is a multiplicity of blades 26, one of which is shown in FIG. 2. The blade has a length L of about 64 mm. At its tip it has a chord length W of about 33 mm and a thickness of about 2.5 mm. In the Figure, the blade 26 is shown as it contacts the circumscribing airseal 28 (shown in phantom) which lines the interior of the engine case. In similar fashion it contacts the grinding wheel 44 in the practice of the invention.

In this description of the invention, it is desired that the blade length L be reduced by an amount $\Delta l$ so that the multiplicity of tips 27 of blade 26 in the rotor will give to the assembly a specified static radius OR. (The radius OR is directly related by calculation to the radius achieved in engine operation, when there is elastic and thermal expansion. For the PW2037 engine OR is about 0.28–0.33 m.) The blades are usually ground at a conical angle with respect to axis C by appropriately shaping the grinding wheel. Thus the representation of a single radius OR will be understood as a simplification. Typically, the rotor will have a rotational speed of about 8–12,000 rpm under normal operating conditions. Under such conditions, the root 30 of each blade is forced very tightly against the restraining slot 24 and there is considerable stress and resultant radial strain in the blade.

Figure 3:
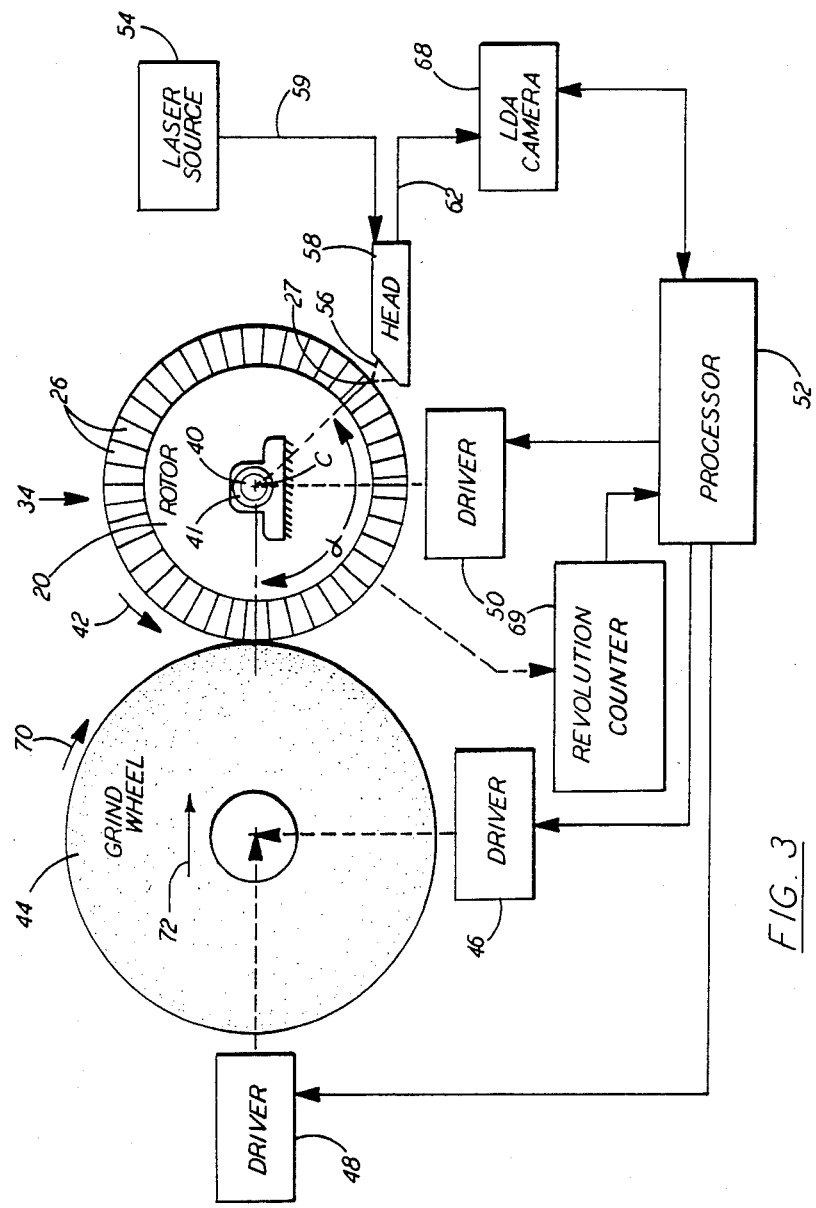
FIG. 3 is a semi-schematic end view of the rotor assembly grinding apparatus of the invention.

The essential aspects of the apparatus used in the practice of the invention are shown in FIGS. 1 and 3. Details of the system for measuring the length of blades and for controlling the various motors are described in more detail in the related patent application Ser. No. 501,982 referred to above, the disclosure of which is hereby incorporated by reference.

The rotor assembly 34, comprised of a disk 20 and a plurality of blades 26, is mounted rotatably on a shaft 40 similar to the ordinary manner in which a circular workpiece is mounted in a horizontal spindle centertype cylindrical grinding machine. Sometimes the shaft is integral with the assembly. High precision bearings having low radial clearance and being similar to those used on rotor balancing machines should be used to support the shaft. Vibration is monitored during initial spinning of the rotor and if present it is eliminated. The shaft 40, and therefore the rotor assembly 34, is rotated by an electric motor driver 50 in the direction of normal engine rotation of the rotor assembly, as indicated by the arrow 42. A grinding wheel 44 rotates and translates to and from the rotor within the same plane as the plane of the disk. (Translation parallel to the axis C is optional, depending on the exact particulars by which the conical angle is achieved.) These motions are controlled respectively by the drivers 46, 48. All drivers are controlled by the processor 52.

A laser gaging system is used to constantly monitor the length of each of the passing blades, as described in more detail in the related application. In summary, the laser source 54 delivers a coherent beam of light 56 to the head 58. The beam 56 is impinged on the tips 27 of the passing blades and its reflection is received by the optical fiber 62, whereupon the intensity and location of the reflection is measured by the linear diode array camera detector 68, in timed relationship to the presence of a passing blade 26. This location of the reflected beam is related to the length of a blade 26. The camera 68 provides a signal to the processor 52 which is preprogrammed with the desired blade length (i.e. a function of radius OR) and other parametric constraints mentioned below. The processor also receives input about the angular position of the rotor from encoder 69 and thus associates a blade length signal from the camera with a particular blade on the rotor. Based on this information, the processor controls the actions of drivers 46, 48, 50.

The laser measuring head is of course properly positioned radially using conventional machine shop techniques, prior to placement of the rotor in its bearing mounting assembly. The circumferential location of the laser beam's point of impingement on the blade tips is important. It must be sufficiently removed circumferentially (in the direction of rotation) from the point of grinding, to allow restoration of locational stability to the blades after possible deflection during grinding and to avoid impingement by grinding sparks and dust 71. It must be located at least 45° from the point of grinding, and preferably is located between 135°–270°, as the angle $\alpha$ is shown in FIG. 3.

In the preferred practice of the invention, the PW2037 rotor assembly is rotated at a speed of 2000 rpm. This produces a centripetal acceleration on each blade of about 11,100 m/sec$^2$, or about 1130 g (where g is acceleration of gravity). This corresponds with a tangential tip velocity of about 60 m/s. Since this tip velocity is in excess of the known range which is feasible for machining titanium alloy without unacceptable burning, cracking, or residual stress, the grinding wheel 44 is counterrotated in a direction 70 as shown in the Figures, so that it rotates in a direction opposite that of the assembly. This means that at the point of contact the abrasive surface is moving in the same direction as the blade tip. The peripheral speed of the wheel is set so that the relative grining velocity is in the range of 20–40 m/s. A typical vitreous bond alumina wheel is used, such as a 0.76 m diameter 90-100 grit, L-0 hardness wheel. Of course other abrasives, including abrasive belts may be used. Coolant is not used to avoid disruption of the laser gage and to avoid the necessity of cumbersome containment shielding.

The driver 48 is actuated to translate (infeed) the grinding wheel 44 in the direction of arrow 72 toward the centerline of rotation of the rotor assembly. About 0.4–0.8 mm of material typically will be removed from blade tips in the process. To accomplish this in the most efficient manner possible, a stepped infeed rate is used. The grinding wheel is infed at a first high speed followed by a progressive slowing down to a final infeed rate, up to a stop position, where there is usually dwell to enable sparking out. The following is a typical operating sequence: First, the grinding wheel is plunged toward the part at a relatively high rate of about 0.0013 mm/sec., until about 0.25 mm remain to be removed. Then the rate is slowed to about 0.0008 mm/sec. to obtain more accuracy and uniformity in finishing, until about 0.025 mm remains to be removed. Next, the rate is slowed to 0.0004 mm/s or less, until the final or basic dimension is reached. The foregoing procedure is effective because, notwithstanding the high rotational speed of the rotor, there is apparently still some inevitable deflection or movement of the blades as they pass by the grinding wheel. If the slow feed rate is not used, then there will be unevenness among the several blades, which although at about ±0.05 mm and small in an absolute sense compared to the prior art, will not be excellent as is the ±0.025 mm which is possible. A very slow and precisely controlled feed rate at the final step is also advantageous in preventing the presence of a burr. If a burr is formed on the tip of the blade, as it will be if the feed rate exceeds about 0.0004 mm, a further finishing operation such as polishing or abrasive brushing must be used to remove the burr.

The grinding wheel is infed to a final location which generates a measured value of the predetermined 2000 rpm radius OR'. The radius OR' is less than the radius OR" which the assembly assumes during use and it is greater than the radius OR which is the ordinarily specified desired static dimension of the rotor assembly, assuming proper seating of the blades. The relationship between the various outside radii is a function of the degree of proper seating and the extent of elastic deformation under rotation. In the invention, there is a convenient method for achieving the desired OR dimension. The rotor is measured at two incremental speeds, e.g., at 1000 and 2000 rpm. This provides an actual elastic strain measurement and enables extrapolation of the 0–2000 rpm radial strain. Thus, the radius OR' at the speed of grinding, e.g., at 2000 rpm, can accurately be determined for a given specification of OR.

The laser measuring system permits measurements of individual blade lengths. With this capability, I have discovered certain criticalities in the grinding process which when complied with enable the achievement of better accuracies than heretofore possible.

Figure 5:
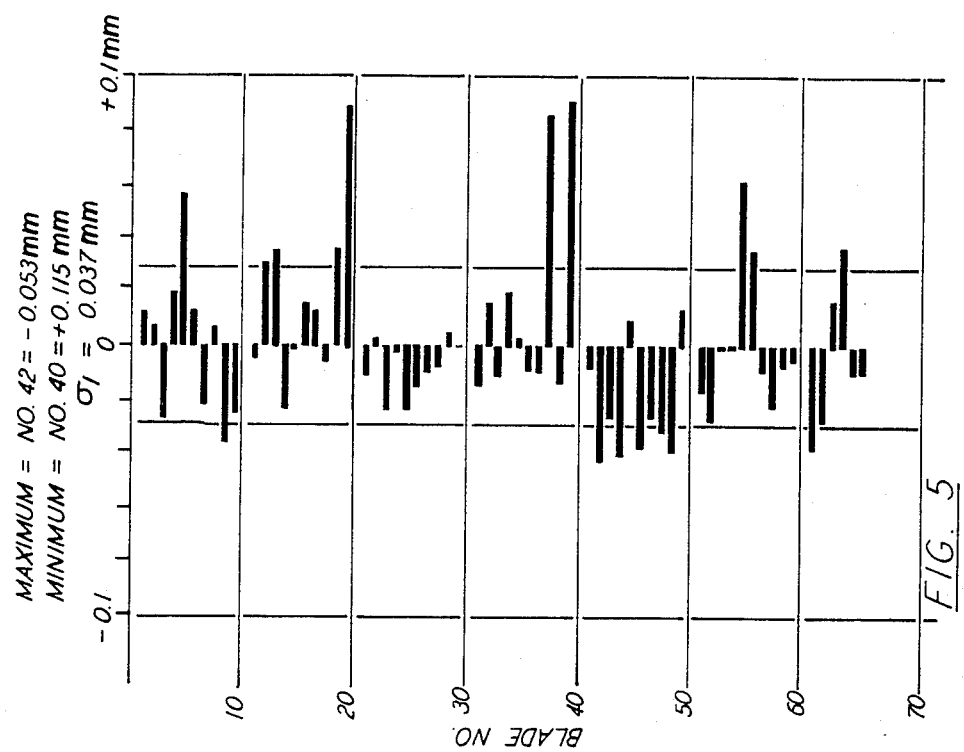
FIGS. 4 and 5 are graphical presentations which show individual blade lengths for rotor assemblies which have been ground with different results.
Figure 4:
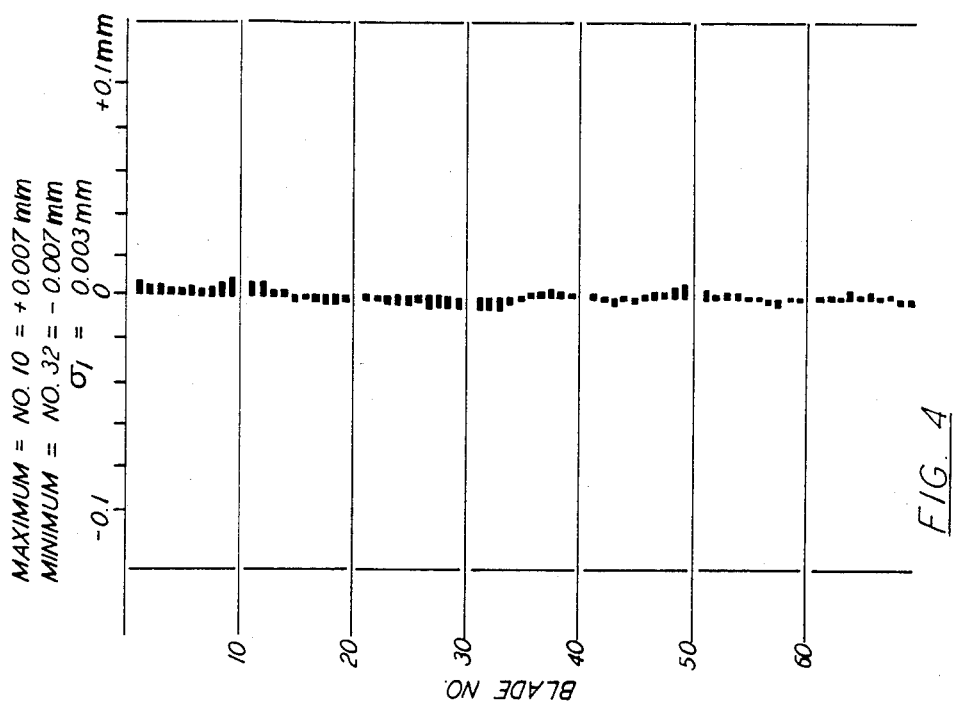

The laser gage dimensional data are shown in the FIGS. 4 and 5. The total variations, from a baseline OR' are shown, together with the standard deviation $\Delta l$. FIG. 4 shows a rotor assembly ground at high speed and having very uniform blades, with less than ±0.025 mm variation. FIG. 5 shows the kind of results which will be produced when too low a rotational speed is used. It is seen that there is substantial variation (although still small in an absolute sense). It is hypothesized that during grinding all the longer blades deflect to varying slight degrees as compared to the minimum length blades.

Based on analysis of such data from machining titanium alloy compressor rotors, I have discovered certain general conclusions. There is a critical direction and speed which a rotor must achieve during grinding. First, the rotation must be in a direction which causes on the blades tangential fluid dynamic (and grinding) forces which act in the same direction as occur in the actual use of the assembly. That is, airfoil blades have opposing convex and concave sides. Blades which compress gases rotate in the direction of the concave side while turbine section blades which expand gases rotate in the direction of the convex side. However, in both instances the working gas of the engine impinges on the concave side of the airfoil, and it is in this direction which the airfoil must move during machining. Such motion causes the blade to tend to aerodynamically function by imparting motion to the surrounding air during machining. Previously, it has often been thought desirable to rotate the assembly in the opposite convex direction, to lower the power required to rotate the rotor. Second, I have discovered that the rotor assembly must achieve a certain minimum speed. This speed is characterized alternately in terms of the airflow which the rotor produces or in terms of the acceleration which is produced in the blades. The rotational speed of a compressor from an axial flow turbomachine must firstly be sufficient to cause substantial axial flow of air during grinding, as opposed to the essentially radial flow which is caused at lower speeds. The airflow criticality is related to the requirement for rotational direction. Axial flow is indicative of the blades reaching a speed where they commence to be subjected to a relative flow similar to that which exists when they are used. Of course, such conditions require substantial horsepower, and this is the reason they have been avoided in the past. I have not taken precise measurements of when the flow mode change occurs, but it appeared to occur at about 1450 rpm for the PW2037 rotor. The manner of airflow is measurable with a suitable aerodynamic device, such as pitot tube. However, I have carefully used the feel of air blowing on my hand to measure the direction of the issuing air. The onset of the axial flow regime is also discernible by a significant change in the slope of the power versus speed curve. Of course the flow mode is mixed even when the objective of the invention practice is achieved, since the rotor is uncontained. In the practice of the invention it will be noted that below the critical speed there is little discernible axial flow (parallel to the C axis in the Figures);

radial flow predominates. At or above the critical speed there is substantial axial flow.

The speed of a bladed assembly must be such that a radial acceleration of at least 700 g is produced on the blades. This second criticality is based on obtaining sufficient force to thrust the blades outwardly for two deduced purposes. First, the blades must be adequately seated in a manner similar to that in which they experience in engine use. Second, the blades must be subjected to a force sufficient to resist the contact forces produced by the medium which is mechanically removing material from the blade. This disruptive contact force is principally tangential but there is no doubt radial inward force as well. The phenomena underlying this aspect of the invention have not been intensively investigated but it appears that at lower speeds there is translation of the blade tips as they contact the grinding wheel. At too low a speed a rotor will be ground with blades which are both shorter and longer than the desired nominal length. It is presumed that a blade can be cocked (owing to the necessary loose fit of a removable blade in the disk slot) during grinding and not be restored to its true position during final grinding, regardless of the conventional dwell or "sparking out" at the end of the grind. There are other disruptive factors which dictate the high rotational speed required in the invention. Sealants are used on various stages of high pressure compressors, including rubber, ceramic and metal materials. Their resilience or uneven presence must be compensated for.

Unless the acceleration and airflow criteria set forth are achieved, an accuracy worse than ±0.025 mm on a 0.30 m radius will result. The rotational speed of compressor rotors must preferably be sufficient to achieve both the acceleration and airflow criteria, but the exact speed where each criteria is met will vary with the particular rotor assembly. At least the rotor should turn in the direction indicated above and at least it should rotate at a speed sufficient to generate the radial acceleration needed to resist the grinding forces. The primary work done herein was with the compressor rotors, but a superalloy turbine rotor was ground as well at 2000 rpm. Turbine rotors are designed for considerably higher gas temperatures and near sonic velocities. Simple rotation in air cannot approximate such conditions and thus the blades are less effective in inducing axial flow. On such rotors the meeting of the acceleration criterion alone will be sufficient for good results. The grinding forces of course may be less with different grinding media and feed rates, and these can allow lower accelerations. If the direction and acceleration criteria are met then the axial airflow requirement may not need to be met to obtain the desired results.

For the PW2037 rotor, the acceleration speed criterion is met by rotating at 1700 rpm or higher, preferably 2000 rpm. Below about 1700 rpm blade uniformity did not meet the ±0.025 mm goal. Higher speeds can be used but there is considerable noise, pumping of air, and additional horsepower required from the primary driver. Therefore, for such rotor assemblies the speed should be held in the practical range 1700–2300 rpm. (Of course at the 1700 rpm range, the rotor is substantially into the range which produces axial airflow.)

A 0.38 m radius typical titanium compressor rotor of a larger Pratt & Whitney PW4000 engine was also ground. The power limitation of the driver 50 prevented achieving speeds greater than 1400 rpm. Visual observation of the grinding action and general behavior suggested that conditions were marginal compared to the PW2037 rotor grinding at the preferred 2000 rpm. Nonetheless satisfactory radius dimension results were achieved. Previously, analogous rotors were ground using lower speeds of about 200 rpm, as mentioned in the background. Exemplary data are summarized in Table 1. While 1400 rpm was not satisfactory for the PW2037 rotor, it was marginally satisfactory for the larger PW4000 rotor. This indicates that the rotational speed required to properly seat the blades and maintain them in good position during grinding can be best understood in terms of the centripetal force produced on the blades. Of course this force is a function of the mass of the blade and such will vary with the size and material of the blade. Therefore a more general parameter of relevance is the radial or centripetal acceleration. The data indicate that the radial acceleration should be at least 700–750 g (6870–7360 m/s$^2$) and preferably 1100 g (10,800 m/s$^2$) or more.

In the preferred practice of the invention a grinding wheel is used. The relative grinding speeds for titanium alloys are far in excess of those which were known to be obtainable, and are essentially in a new realm. However, other mediums for removing material from the tips of blades may be used in the practice of the invention. Other mechanical tools, such as single point tools, which remove material from the tips of blades while causing a tangential and radial force on them, may be used. They will create problems similar to those described herein and will be within the scope of the practice of the invention.

The principles of the invention will be applicable as well to other configurations of rotor assemblies, including the more traditional axial slot designs referred to above. While the invention is described in terms of the machining of a bladed rotor assembly for a gas turbine engine, it should be understood that it will be equally applicable to the grinding of other rotatable assemblies of analogous character. In such instances of course the airflow criterion will not be relevant, but the acceleration and other parameters will be. Although this invention has been shown and described with respect to a preferred embodiment, it will be understood by those skilled in the art that various changes in form and detail thereof may be made without departing from the spirit and scope of the claimed invention.

TABLE 1

| | Variation in Tolerance in Grinding Rotor Assembly Radius at Different Speeds | | |
|---|---|---|---|
| Rotor Radius-OR (m) | Speed (rpm) | Blade Radial Acceleration* (g's) | Variation In Tip Radii (mm) |
| 0.28 | 1400 | 675 | ±0.075 |
| 0.28 | 1700 | 820 | ±0.025 |
| 0.28 | 2000 | 1135 | ±0.025 |
| 0.38 | 200 | 107 | ±0.075 |
| 0.38 | 1400 | 751 | ±0.025 |

*Acceleration is a function of speed and the radius of the blade center of mass. Typically, the radius is approximately the disk radius.

I claim:

1. The method of finishing to a desired dimension the tips of a plurality of airfoil blades removably mounted around the periphery of a rotor disk, the combination comprising a rotor assembly of an axial flow turbomachine, which comprises rotating the rotor assembly about a rotor axis in a direction which moves the airfoil blades in a concave side direction so that air impinges on the blades in the same direction as it impinges during use of the axial flow turbo-machine, the rotating speed being sufficient to cause the rotor blades to move air in substantial quantity along the direction of said rotor axis; and contacting the tips of the blades with a medium which removes material therefrom.

2. The method of claim 1 wherein the medium which contacts the blade tips is an abrasive surface moving in the same direction as the blade tips at the point of contact.

3. The method of claim 1 wherein the medium is a grinding wheel which rotates in a direction opposite to the direction of rotation of the rotor assembly.

4. The method of claim 3 wherein the blades are made of titanium alloy and further comprising rotating the grinding wheel to produce a wheel peripheral speed sufficient to maintain the relative velocity between the grinding wheel and the blade tips at the point of contact in the range 20–40 m/s.

5. The method of claim 4 wherein the rotor assembly has a diameter of about 0.03 m and rotates at a speed of 1700–2000 rpm.

6. The method of claim 4 further comprising infeeding the grinding wheel toward the blade tips at a rate of less than 0.0004 mm/sec to avoid the formation of a burr on the tips.

7. The method of finishing to a desired dimension the tips of a plurality of blades mounted around the periphery of a rotor disk, the combination comprising a rotor assembly, which comprises rotating the rotor assembly at a speed sufficient to cause an acceleration of at least 700 g (6,870 m/s$^2$) on the blades, and contacting the tips of the rotating blades at a point around the circumference of rotation with a medium which mechanically removes material therefrom, the acceleration causing the blades to seat in the disk and to resist forces produced on the blade by the medium.

8. The method of claim 7 wherein the medium which contacts the blade tips is an abrasive surface moving in the same direction as the blade tips at the point of contact.

9. The method of claim 8 wherein the medium is a grinding wheel which rotates in a direction opposite to the direction of rotation of the rotor assembly.

10. The method of claim 8 wherein the blades are made of titanium alloy further comprising rotating the grinding wheel with a peripheral speed sufficient to maintain the relative velocity of the grinding wheel to the blade tips at 20–40 m/s.

11. The method of claim 10 wherein the rotor assembly has a radius of 0.3 m and rotates at a speed of 1700–2000 rpm.

12. The method of claim 10 further comprising infeeding the grinding wheel toward the blade tips at a rate of less than 0.0004 mm/sec to avoid the formation of a burr on the tips.

13. The method of claim 7 wherein the rotating speed produces an acceleration of at least about 820 g (8,050 m/s$^2$).

14. The method of claim 7 wherein the rotating speed produces an acceleration of at least about 1100 g (11,800 m/s$^2$).

* * * * *